United States Patent
Tsai et al.

(10) Patent No.: US 7,138,022 B2
(45) Date of Patent: Nov. 21, 2006

(54) METHOD FOR ASSEMBLING A COMPONENT OF A LIQUID CRYSTAL DISPLAY DEVICE

(75) Inventors: Chi-Feng Tsai, Kao-Hsiung (TW); Kuang-Tao Sung, Tai-Chung Hsien (TW); Shih-Hsien Chen, Tai-Chung Hsien (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 10/904,945

(22) Filed: Dec. 6, 2004

(65) Prior Publication Data

US 2005/0145321 A1 Jul. 7, 2005

Related U.S. Application Data

(63) Continuation-in-part of application No. 10/249,893, filed on May 15, 2003, now abandoned.

(30) Foreign Application Priority Data

Mar. 7, 2003 (TW) ............................... 92105016 A

(51) Int. Cl.
B32B 37/06 (2006.01)
B32B 37/10 (2006.01)
B32B 37/12 (2006.01)
B32B 38/00 (2006.01)

(52) U.S. Cl. .................. 156/64; 156/152; 156/286
(58) Field of Classification Search ................ 156/152, 156/286
See application file for complete search history.

(56) References Cited

U.S. PATENT DOCUMENTS

| 5,459,410 | A | * | 10/1995 | Henley | 324/770 |
| 5,592,288 | A | * | 1/1997 | Sampica et al. | 356/62 |
| 5,835,179 | A | * | 11/1998 | Yamanaka | 349/161 |
| 5,956,108 | A | * | 9/1999 | Izumi et al. | 349/73 |
| 6,184,977 | B1 | * | 2/2001 | Ishida | 356/239.1 |
| 6,310,612 | B1 | * | 10/2001 | Kotsubo et al. | 345/173 |
| 6,331,882 | B1 | * | 12/2001 | Shimodaira et al. | 349/122 |
| 6,459,462 | B1 | * | 10/2002 | Seraphim et al. | 349/73 |
| 2003/0232192 | A1 | * | 12/2003 | Kishioka et al. | 428/354 |

FOREIGN PATENT DOCUMENTS

| CN | 1321908 A | | 11/2001 |
| JP | 55-140817 | * | 11/1980 |
| JP | 57-139720 | * | 8/1982 |
| JP | 59-226324 | * | 12/1984 |
| JP | 61-129623 | * | 6/1986 |
| JP | 63-318523 | | 12/1988 |
| JP | 64-90404 | * | 4/1989 |
| JP | 5-30838 | | 4/1993 |
| JP | 5-173103 | * | 7/1993 |

(Continued)

*Primary Examiner*—Melvin Mayes
(74) *Attorney, Agent, or Firm*—Winston Hsu

(57) ABSTRACT

A method for assembling a component of a liquid crystal display device is introduced. An adhesion step is performed to adhere a flexible film to a substrate to form an assembled component by using an adhesion material covered over the overlapping area between the flexible film and the substrate. A plurality of air bubbles are trapped between the substrate and the flexible film by the adhesion material. To expel the air bubbles out of the assembled component, the assembled component is placed in an airtight chamber and a heating-pressurizing step is performed in the airtight chamber for properly raising the temperature of the assembled component and the air pressure within the airtight chamber.

16 Claims, 4 Drawing Sheets

FOREIGN PATENT DOCUMENTS

| | | | |
|---|---|---|---|
| JP | 6-108031 | | 4/1994 |
| JP | 6-126150 | * | 5/1994 |
| JP | 11-125715 | * | 5/1999 |
| JP | 2004-157171 | * | 6/2004 |
| JP | 2004-198950 | * | 7/2004 |
| JP | 2004-349438 | * | 12/2004 |

* cited by examiner

METHOD FOR ASSEMBLING A COMPONENT OF A LIQUID CRYSTAL DISPLAY DEVICE

CROSS REFERENCE TO RELATED APPLICATIONS

This is a continuation-in-part of U.S. patent application Ser. No. 10/249,893, filed on May 15, 2003 now abandoned, and which is included herein by reference.

BACKGROUND OF INVENTION

1. Field of the Invention

The present invention relates to a method for assembling a component of a liquid crystal display device, and more specifically, to a method for assembling a component of a liquid crystal display device capable of effectively expelling bubbles from the component.

2. Description of the Prior Art

Since the advantages of a liquid crystal display (LCD) device over a conventional CRT monitor include better portability, lower power consumption, and lower radiation, the LCD is widely used in various portable products, such as notebooks, personal data assistants (PDAs), etc. Furthermore, there is a tendency for the LCD to replace the conventional CRT monitor.

Generally, a liquid crystal display device comprises a liquid crystal display panel, an upper polarizer film positioned on an upper surface of the liquid crystal display panel, a lower polarizer film positioned on a lower surface of the liquid crystal display panel, and a backlight disposed below the lower polarizer film for generating light beams to irradiate the liquid crystal display panel. Additionally, the liquid crystal display panel includes an upper substrate, a lower substrate, and a liquid crystal molecular layer sealed between the upper substrate and the lower substrate. As the light beams pass the liquid crystal molecular layer, the polarization and the refraction of the light beams vary according to the orientation of the liquid crystal molecules. Accordingly, the light transmittance of the liquid crystal display panel can be controlled through altering the orientation of the liquid crystal molecules, and therefore, the liquid crystal display device can display plenty of images.

Additionally, since the liquid crystal display device is composed of a lot of components, the fabrication for fabricating the liquid crystal display device comprises a great many steps for assembling the components. For example, an adhesion step that utilizes an adhesion material for adhering and fixing one part to another part is a popular method used for assembling the components. Usually, the adhesion step can be applied to adhere the upper polarizer film to the upper substrate or to fix the upper substrate to the lower substrate. However, it is quite complicated to rework the adhesion step, so that the reliability for performing the adhesion step is a noticeable and important parameter.

Please refer to FIG. 1 and FIG. 2. FIG. 1 and FIG. 2 are schematic diagrams for connecting a polarizer film to a glass substrate of a liquid crystal display device. As shown in FIG. 1, a glass substrate 10 having an adhesion material 14 thereon, and a polarizer film 12 are firstly provided. Then, an assembling process is performed to apply suitable and even forces on both of the glass substrate 10 and the polarizer film 12 for adhering the polarizer film 12 to the glass substrate 10 through the adhesion material 14, as shown in FIG. 2.

Nevertheless, due to process errors or other factors, bubbles 16 always remain between the polarizer film 12 and the adhesion material 14 or between the adhesion material 14 and the glass substrate 10, as shown in FIG. 2. Unfortunately, the connective regions between the polarizer film 12 and the adhesion material 14 or between the adhesion material 14 and the glass substrate 10 are decreased owing to those bubbles 16, which leads to reducing the adhesive forces between the polarizer film 12, the adhesion material 14, and the glass substrate 10. Moreover, since the bubbles 16 are full of air, the bubbles 16 will expand when a temperature of an ambient environment is raised and shrink when the temperature of the ambient environment is dropped, which leads to largely decreasing the reliability of products. Furthermore, as the bubbles 16 appear within a displaying region of the liquid crystal display device, a displayed image will be deteriorated seriously and customers will complain. For resolving the above-mentioned problem, the prior art method utilizes manpower or machines to repeatedly press the component composed of the polarizer film 12, the adhesion material 14, and the glass substrate 10 for expelling the bubbles 16 from the component. However, the prior art method consumes a lot of manpower and time and cannot effectively expel the bubbles 16 from the component, thus reducing production efficiency.

SUMMARY OF INVENTION

It is therefore a primary objective of the claimed invention to provide a method for assembling a component of a liquid crystal display device to solve the above-mentioned problem.

According to the claimed invention, a method for assembling a component of a liquid crystal display device is provided. At first, an adhesion step is performed to adhere a flexible film to a substrate to form an assembled component by using an adhesion material covered over the overlapping area between the flexible film and the substrate. Wherein, a plurality of air bubbles are trapped between the substrate and the flexible film by the adhesion material. Thereafter, a heating-pressurizing step is performed in an airtight chamber to raise the temperature of the assembled component and to raise the air pressure within the airtight chamber so as to expel air bubbles out of the assembled component.

It is an advantage over the prior art that the claimed invention provides the heating-pressurizing step in the airtight chamber after the adhesion step is completed for properly raising the temperature and the pressure of the airtight chamber to expel the bubbles from the component completely.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
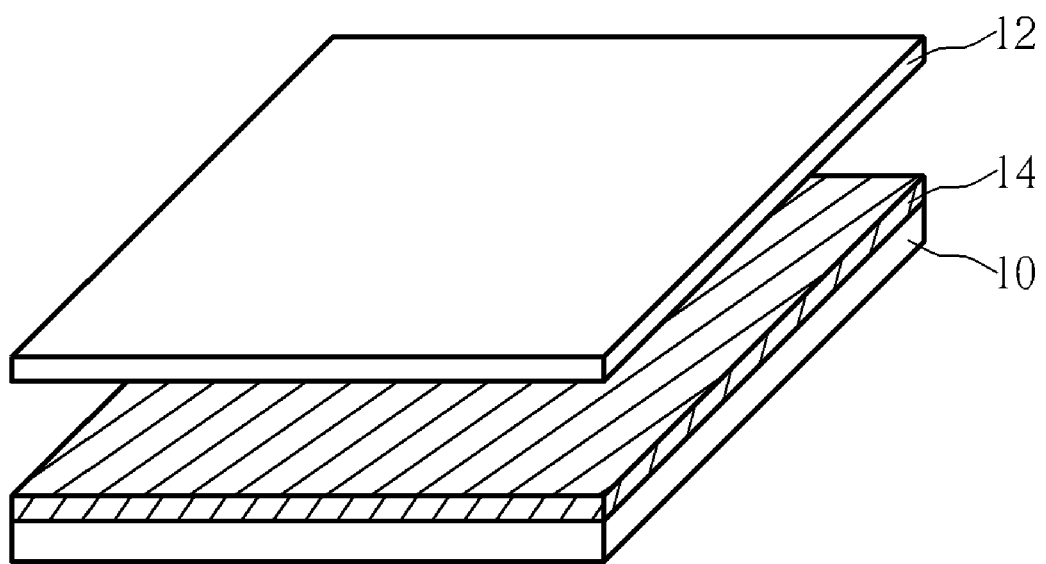
FIG. 1 and FIG. 2 are schematic diagrams for connecting a polarizer film to a glass substrate of a liquid crystal display device.
Figure 2:
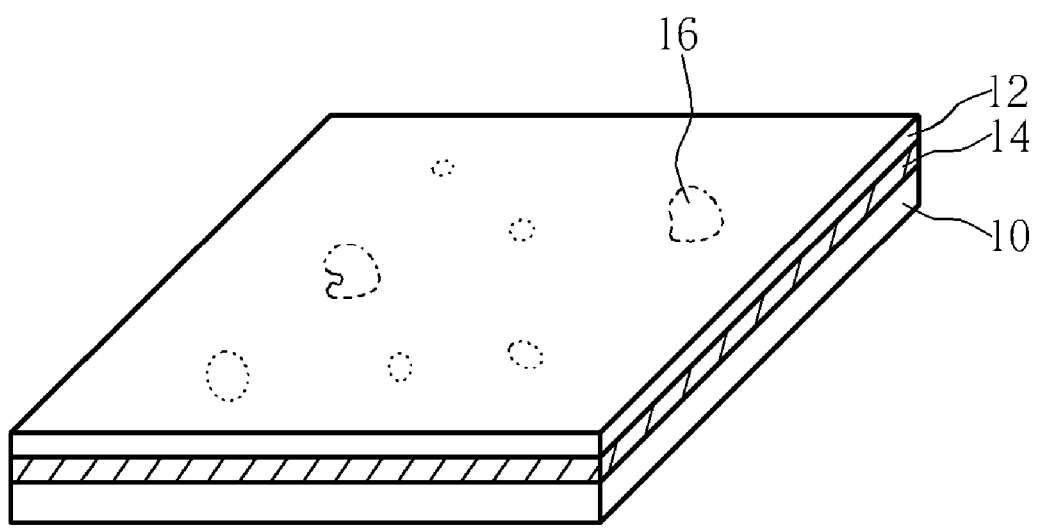
Figure 3:
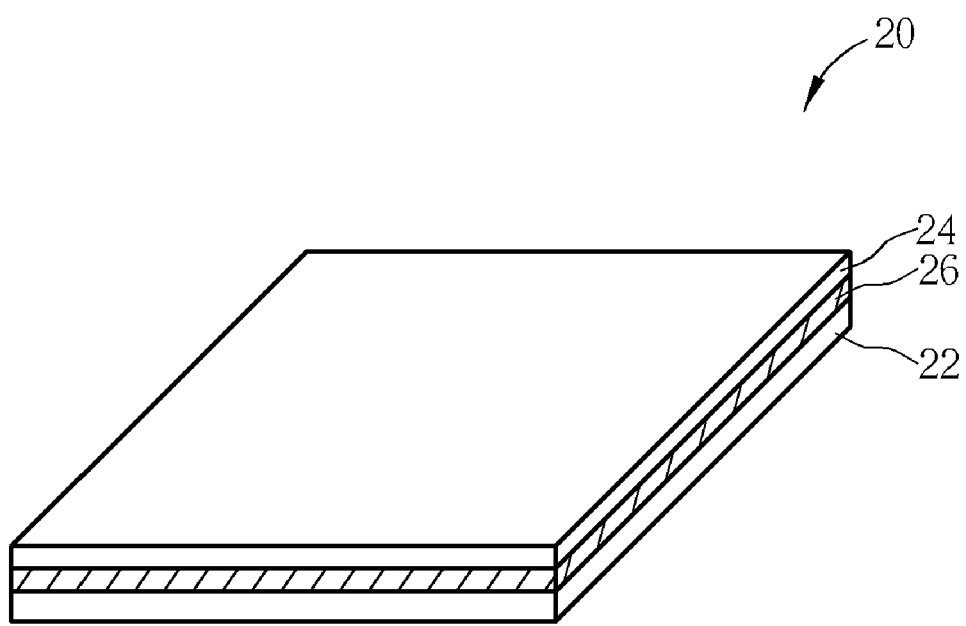
FIG. 3 and FIG. 4 are schematic diagrams for assembling a component of a liquid crystal display device according to the present invention.
Figure 4:
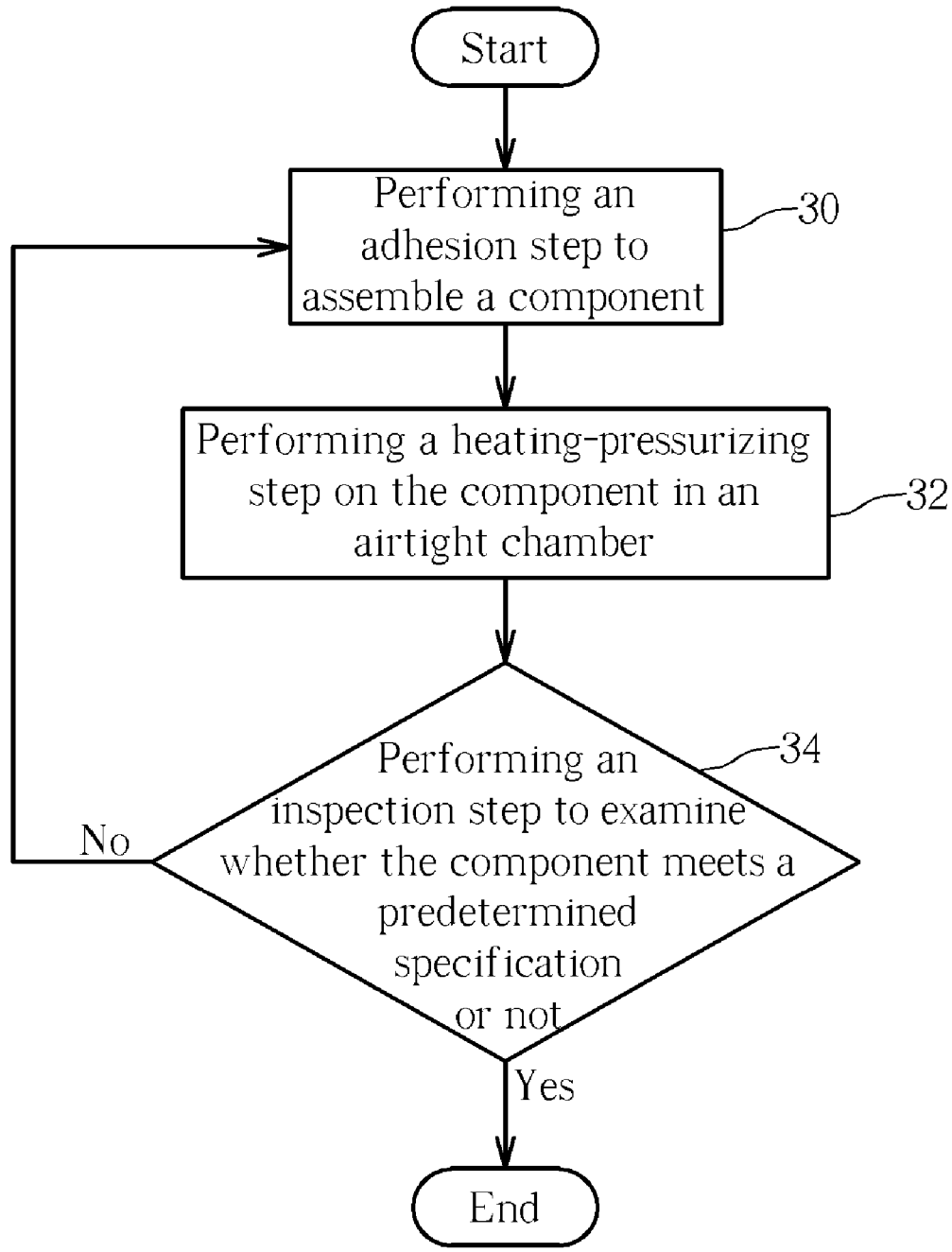

Please refer to FIG. 3 and FIG. 4. FIG. 3 and FIG. 4 are schematic diagrams for assembling a component of a liquid crystal display device according to the present invention. As shown in FIG. 3, a component 20 comprises a part 22, a part 24, and an adhesion material 26 for adhering the part 22 to the part 24. In the preferred embodiment of the present invention, the part 22 is a rigid substrate, for example, the part 22 can be a glass substrate used for fabricating a color filter substrate or a thin film transistor substrate. In addition, the part 22 can be a touch panel. The part 24 can be a flexible film, such as a twin-adhesive tape, or the part 24 can be an optical film, such as a polarizer film. The adhesion material 26 is capable of providing repeated adhesion and removal. The adhesion material 26 can be glue such as silicone gel. In another embodiment of the present invention, the part 22 is a liquid crystal display panel, the part 24 is a touch panel, and the adhesion material 26 is a sealant.

Additionally, a method for assembling the component 20 is described as follows. As shown in FIG. 4, an adhesion step 30 is performed to adhere the part 24 to the part 22. As the adhesion step 30 is performed, the part 22 and the part 24 are provided firstly, the adhesion material 26 is then formed on the part 22 to evenly cover over the overlapping area between the part 22 and the part 24, and finally, an assembling process is performed to apply suitable and even forces on both of the part 22 and the part 24 for adhering the part 24 to the part 22 through the adhesion material 26. Therefore, the adhesion step 30 for forming the assembled component 20 is completed.

In another embodiment of the present invention, the adhesion material 26 can be applied on either or both of the part 22 and the part 24. The adhesion material 26 can be applied on the entire overlapping area between the part 22 and the part 24, or the adhesion material 26 can be applied on the rim of either the part 22 or the part 24.

Since a plurality of air bubbles are trapped between the part 22 and the part 24 by the adhesion material 26 after the adhesion step 30, the assembled component 20 is placed into an airtight chamber and a heating-pressurizing step 32 is performed in the airtight chamber for expelling the air bubbles out of the assembled component 20, as shown in FIG. 4. In the preferred embodiment of the present invention, as the heating-pressurizing step 32 is performed, a first heating process is performed to raise the temperature of the assembled component 20 from a room temperature to a temperature $T_1$, and remain the temperature of the assembled component 20 at the temperature $T_1$ for one to two minutes. After the temperature of the assembled component 20 is remained at $T_1$, a pressurizing process is performed to raise the air pressure within the airtight chamber to a pressure $P_1$ and remain the air pressure within the airtight chamber at the pressure $P_1$. Following that, a second heating process is performed at the pressure $P_1$ for raising the temperature of the assembled component 20 to a temperature $T_2$, and the assembled component 20 is remained at the temperature $T_2$ and at the first pressure $P_1$ for about 10 to 15 minutes. The temperature of the assembled component 20 are then adjusted between the first temperature $T_1$ and the second temperature $T_2$, for example, the temperature of the assembled component 20 can be repeatedly lowered from $T_2$ to $T_1$ and raised from $T_1$ to $T_2$ for at least two or three times. During the adjustment in the temperature of the assembled component 20, the air pressure within the airtight chamber is always remained at the first pressure $P_1$. Finally, the air pressure and the temperature of the chamber are lowered to the atmospheric pressure and the room temperature to complete the removal of the air bubbles from the component.

Noticeably, the temperature $T_1$, the temperature $T_2$, and the pressure $P_1$ are determined according to a volume of the chamber, a dimension of the component 20, the number of the components 20, an amount of the adhesion material 26 used in the component 20, the dimensions of the air bubbles, and the number of the air bubbles. In addition, the raising rates in the heating processes and the pressurizing process should be carefully controlled, so as to prevent rapid deformation of the part 24 and separation of the part 24 from the assembled component 20. In the preferred embodiment of the present invention, the temperature $T_1$ is between 30° C. and 50° C., the pressure $P_1$ is between 1 kPa and 3 kPa, the temperature $T_2$ is between 50° C. and 70° C., and a duration for performing the heating-pressurizing step is between 15 minutes and 30 minutes.

Noticeably, since the bubbles within the component 20 are full of air and the heating-pressurizing step is performed in the airtight chamber, as the temperature of the chamber is raised to the temperature $T_1$, the bubbles within the component 20 will expand to increase the pressure of the chamber. Thereafter, the pressurizing process is performed to raise the pressure of the chamber to the pressure $P_1$, and the pressure $P_1$ will force the bubbles to escape from a crack of the component 20. Therefore, the bubbles can be almost completely expelled from the component 20.

In another embodiment of the present invention, the heating-pressurizing step comprises performing a heating process and a pressurizing process simultaneously for raising the temperature of the assembled component and the air pressure within the airtight chamber to a temperature $T_2$ and a pressure $P_2$. Then, the temperature and the pressure of the chamber are held at the temperature $T_2$ and the pressure $P_2$ for expelling bubbles from the component 20. In this embodiment, the temperature $T_2$ is between 30° C. and 70° C., the pressure $P_2$ is between 1 kPa and 3 kPa, and a duration for performing the heating-pressurizing step is between 15 minutes and 30 minutes.

Please refer to FIG. 4 again. As shown in FIG. 4, an inspection step 34 is performed to utilize an inspection apparatus such as a surface scan for examining whether the component 20 meets a predetermined specification or not. The predetermined specification comprises a dimension of a bubble, the number of bubbles, or both of them. For example, the predetermined specification provides that a dimension of a bubble is 1 mm and the number of bubbles is 10. If a diameter of a bubble is larger than 1 mm or the number of bubbles is larger than 10, the component 20 does not meet a predetermined specification. On the contrary, if a diameter of a bubble is smaller than 1 mm and the number of bubbles is fewer than 10, the component 20 meets a predetermined specification.

As shown in FIG. 4, after the component 20 meets the predetermined specification, the assembly of the component 20 is completed and the following processes can be performed on the component 20. On the contrary, when the component 20 does not meet the predetermined specification, a rework process is performed on the component 20 for disassembling the component 20, and then, the steps from the adhesion step 30 to the inspection step 34 are performed again. Additionally, for expelling the bubbles from the component 20 more effectively, the present invention can be combined with the prior art method that utilizes manpower or machines to repeatedly press the component.

In comparison with the prior art method, the present invention performs the heating-pressurizing step 32 in the airtight chamber after the adhesion step 30 is completed for properly raising the temperature and the pressure of the airtight chamber to expel the bubbles from the component 20. As a result, the advantages of the present invention over the prior art method include that the present invention is more timesaving and laborsaving, and the production yield and the production efficiency can be effectively improved. Moreover, the production rate can be increased as a volume of the airtight chamber is properly enlarged to increase the capacity for accommodating the number of the components 20.

Those skilled in the art will readily observe that numerous modifications and alterations of the method may be made while retaining the teachings of the invention. Accordingly, the above disclosure should be construed as limited only by the metes and bound of the appended claims.

What is claimed is:

1. A method for assembling a component of a liquid crystal display device, the component comprising a substrate and a flexible film, the method comprising:

performing an adhesion step to adhere the flexible film to the substrate to form an assembled component by using an adhesion material covered over the overlapping area between the flexible film and the substrate, wherein a plurality of air bubbles are trapped between the substrate and the flexible film by the adhesion material; and performing a heating-pressurizing step in an airtight chamber to raise the temperature of the assembled component and to raise the air pressure within the airtight chamber so as to expel the air bubbles out of the overlapping area of the assembled component, wherein the heating-pressurizing step comprises:

performing a first heating process for raising the temperature of the assembled component a first temperature;

performing a pressurizing process at the first temperature for raising the air pressure within the airtight chamber to a first pressure;

performing a second heating process at the first pressure for raising the temperature of the assembled component to a second temperature; and adjusting the temperature of the assembled component between the first temperature and the second temperature, and maintaining the air pressure within the airtight chamber at the first pressure.

2. The method of claim 1, wherein the substrate comprises a glass substrate.

3. The method of claim 1, wherein the substrate comprises a touch panel.

4. The method of claim 1, wherein the flexible film comprises a twin-adhesive tape.

5. The method of claim 1, wherein the adhesion material comprises glue.

6. The method of claim 1, wherein the adhesion material comprises a sealant.

7. The method of claim 1, wherein the first temperature is between 30° C. and 50° C., the first pressure is between 1kPa and 3kPa, and the second temperature is between 50° C. and 70° C.

8. The method of claim 1, further comprising an inspection step that is performed after the heating-pressurizing step for examining whether the component meets a predetermined specification.

9. The method of claim 8, wherein when the component does not meet the predetermined specification, a rework process is performed on the component for disassembling the component and performing the adhesion step again.

10. The method of claim 8, wherein the predetermined specification comprises the dimensions of the air bubbles and the number of the air bubbles.

11. A method for assembling a component of a liquid crystal display device, the component comprising a substrate and an optical film, the method comprising:

performing an adhesion step to adhere the optical film to the substrate to form an assembled component by using an adhesion material applied between the substrate and the optical film, wherein a plurality of air bubbles are trapped between the substrate and the optical film by the adhesion material;

placing the assembled component into an airtight chamber;

performing a first heating process for raising the temperature of the assembled component to a first temperature;

performing a pressurizing process at the first temperature for raising the air pressure within the airtight chamber to a first pressure;

performing a second heating process at the first pressure for raising the temperature of the assembled component to a second temperature; and adjusting the temperature of the assembled component between the first temperature and the second temperature, and maintaining the air pressure within the airtight chamber at the first pressure so as to expel the air bubbles out of the assembled component.

12. The method of claim 11, wherein the substrate comprises a rigid substrate, and the optical film comprises a flexible film.

13. The method of claim 11, wherein the substrate comprises a touch panel or a glass substrate.

14. The method of claim 11, wherein the optical film comprises a twin-adhesive tape or a polarizer film.

15. The method of claim 11, wherein the adhesion material is capable of providing repeated adhesion and removal.

16. The method of claim 11, wherein the first temperature is between 30° C. and 50° C., the first pressure is between 1kPa and 3kPa, and the second temperature is between 50° C. and 70° C.

* * * * *